United States Patent
Filsfils et al.

(10) Patent No.: US 9,525,619 B2
(45) Date of Patent: Dec. 20, 2016

(54) SCALABLE EDGE NODE PROTECTION USING SEGMENT ROUTING

(71) Applicant: Cisco Technology, Inc., San Jose, CA (US)

(72) Inventors: Clarence Filsfils, Brussels (BE); Nagendra Kumar, Durham, NC (US); Ahmed R Bashandy, Milpitas, CA (US); Stefano Benedetto Previdi, Rome (IT); Pierre Jean Rene Francois, Madrid (ES); Carlos M. Pignataro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 282 days.

(21) Appl. No.: 14/078,219

(22) Filed: Nov. 12, 2013

(65) Prior Publication Data

US 2015/0109904 A1 Apr. 23, 2015

(30) Foreign Application Priority Data

Oct. 17, 2013 (IT) .............................. RM2013A0571

(51) Int. Cl.
*H04L 12/751* (2013.01)
*H04L 12/707* (2013.01)
(Continued)

(52) U.S. Cl.
CPC .............. *H04L 45/22* (2013.01); *H04L 45/02* (2013.01); *H04L 45/28* (2013.01); *H04L 45/34* (2013.01); *H04L 45/50* (2013.01)

(58) Field of Classification Search
CPC ...................................................... H04L 45/02
(Continued)

(56) References Cited

U.S. PATENT DOCUMENTS 6,765,921 B1 * 7/2004 Stacey .................... H04L 45/00
370/351
7,260,648 B2 * 8/2007 Tingley ............. H04L 29/12009
709/227

(Continued)

OTHER PUBLICATIONS

Filsfils et al., "Segment Routing Use Cases", Network Working Group, Jun. 28, 2013, <draft-filsfils-rtgwg-segment-routing-use-cases-00>, XP015094843, pp. 1-44.

(Continued)

*Primary Examiner* — Andrew Lai
*Assistant Examiner* — Andrew C Lee
(74) *Attorney, Agent, or Firm* — Leon R. Turkevich

(57) ABSTRACT

In one embodiment, a method comprises generating, by a first provider edge router associated with a first segment identifier, a primary label for reaching a destination, and repair information for reaching the destination if a second provider edge router is unavailable to reach the destination; allocating, by the first provider edge router, a first protected next-hop address associated with the first segment identifier for protected reachability to at least the destination; and sending via a core network, by the first provider edge router, an advertisement specifying the label and the repair information, enabling an ingress provider edge router to insert, into a data packet destined for the destination, the labels from the first provider edge router and the second provider edge router based on the repair information, for fast rerouting to the destination via one of the first or second provider edge router if the other is unavailable.

20 Claims, 9 Drawing Sheets

(51) Int. Cl.
*H04L 12/721* (2013.01)
*H04L 12/703* (2013.01)
*H04L 12/723* (2013.01)

(58) Field of Classification Search
USPC .................. 370/216, 219, 221, 225, 227
See application file for complete search history.

(56) References Cited

U.S. PATENT DOCUMENTS

| | | | | |
|---|---|---|---|---|
| 7,269,132 | B1* | 9/2007 | Casey | H04L 41/0663 370/219 |
| 7,568,047 | B1* | 7/2009 | Aysan | H04L 45/02 370/352 |
| 8,011,359 | B1* | 9/2011 | Schultz | F23L 17/005 126/112 |
| 8,014,275 | B1* | 9/2011 | Sundt | H04L 41/0668 370/217 |
| 8,179,905 | B1* | 5/2012 | Napierala | H04L 12/4641 370/237 |
| 8,259,564 | B1* | 9/2012 | Gredler | G06F 11/2005 370/218 |
| 8,279,905 | B2* | 10/2012 | Takagi | B82Y 20/00 372/43.01 |
| 8,724,629 | B1* | 5/2014 | Goli | H04L 12/4625 370/392 |
| 8,780,699 | B1* | 7/2014 | Hasan | H04L 1/22 370/219 |
| 8,787,149 | B1* | 7/2014 | Ramanathan | H04L 45/58 370/216 |
| 8,787,249 | B2* | 7/2014 | Giaretta | H04L 12/14 370/328 |
| 9,100,213 | B1* | 8/2015 | Ramanathan | H04L 12/413 |
| 2004/0255028 | A1* | 12/2004 | Chu | H04L 63/0272 709/227 |
| 2006/0002370 | A1* | 1/2006 | Rabie | H04L 12/4645 370/351 |
| 2010/0008220 | A1 | 1/2010 | Le Roux | |
| 2011/0194404 | A1* | 8/2011 | Kluger | H04L 12/40189 370/218 |
| 2011/0206045 | A1* | 8/2011 | Wijnands | H04L 12/18 370/390 |
| 2013/0031271 | A1* | 1/2013 | Bosch | H04W 40/36 709/245 |
| 2013/0339545 | A1* | 12/2013 | Shenoi | H04L 12/40163 709/240 |
| 2015/0009803 | A1* | 1/2015 | Bashandy | H04L 41/0668 370/219 |
| 2015/0009806 | A1* | 1/2015 | Bashandy | H04L 41/0654 370/221 |

OTHER PUBLICATIONS

Francois et al., "Segment Routing Fast Remote", Network Working Group, Jul. 1, 2013, <draft-francois-sr-frr-00>, XP015094793, pp. 1-12.
Bryant et al., "Remote LFA FRR", Network Working Group, May 23, 2013, <draft-ietf-rtgwg-remote-lfa-02>, XP015090907, pp. 1-15.
Filsfils et al., "Segment Routing Architecture", Network Working Group, Jun. 28, 2013, <draft-filsfils-rtgwg-segment-routing-00>, XP015094844, pp. 1-28.
Bashandy et al., U.S. Appl. No. 13/935,639, filed Jul. 5, 2013.
Bashandy et al., "BGP FRR Protection against Edge Node Failure Using Table Mirroring with Context Labels", Network Working Group, Internet Draft, <draft-bashandy-bgp-frr-mirror-table-00.txt>, Oct. 8, 2012, pp. 1-25.
Bashandy et al., "BGP FRR Protection against Edge Node Failure Using Vector Labels", Network Working Group, Internet Draft, <draft-bashandy-bgp-frr-vector-label-00.txt>, Jul. 7, 2012, 32 pages.
Filsfils et al., "Segment Routing Architecture", Network Working Group, Internet Draft, <draft-filsfils-rtgwg-segment-routing-00>, Jun. 28, 2013, pp. 1-28.
CISCO, "Segment Routing CCO Presentation", [online], 2010, [retrieved on Sep. 26, 2013]. [Retrieved from the Internet: URL: <http://www.slideshare.net/getyourbuildon/segment-routing-network-enablement-for-application>, 32 pages.

* cited by examiner

SCALABLE EDGE NODE PROTECTION USING SEGMENT ROUTING

This application claims priority under 35 USC §119 to Italy Application No. RM2013A000571 filed Oct. 17, 2013.

TECHNICAL FIELD

The present disclosure generally relates to communication networks and more particularly to scalable edge node protection using segment routing.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Wide area networks are composed of edge routers that provide connections for a multi-homed network to a destination network via a core network, also referred to as a backbone network. Since the core network must be composed of core routers that must be able to perform the fastest possible switching operations for extremely large amounts of data traffic, the core routers often are implemented using BGP-free core routers: unlike edge routers that utilize BGP for tunneling data traffic across a core network to destination networks, BGP-free core routers do not employ BGP protocol and therefore do not need to learn about the millions of Internet protocol (IP) address prefixes that may be utilized by the edge routers.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
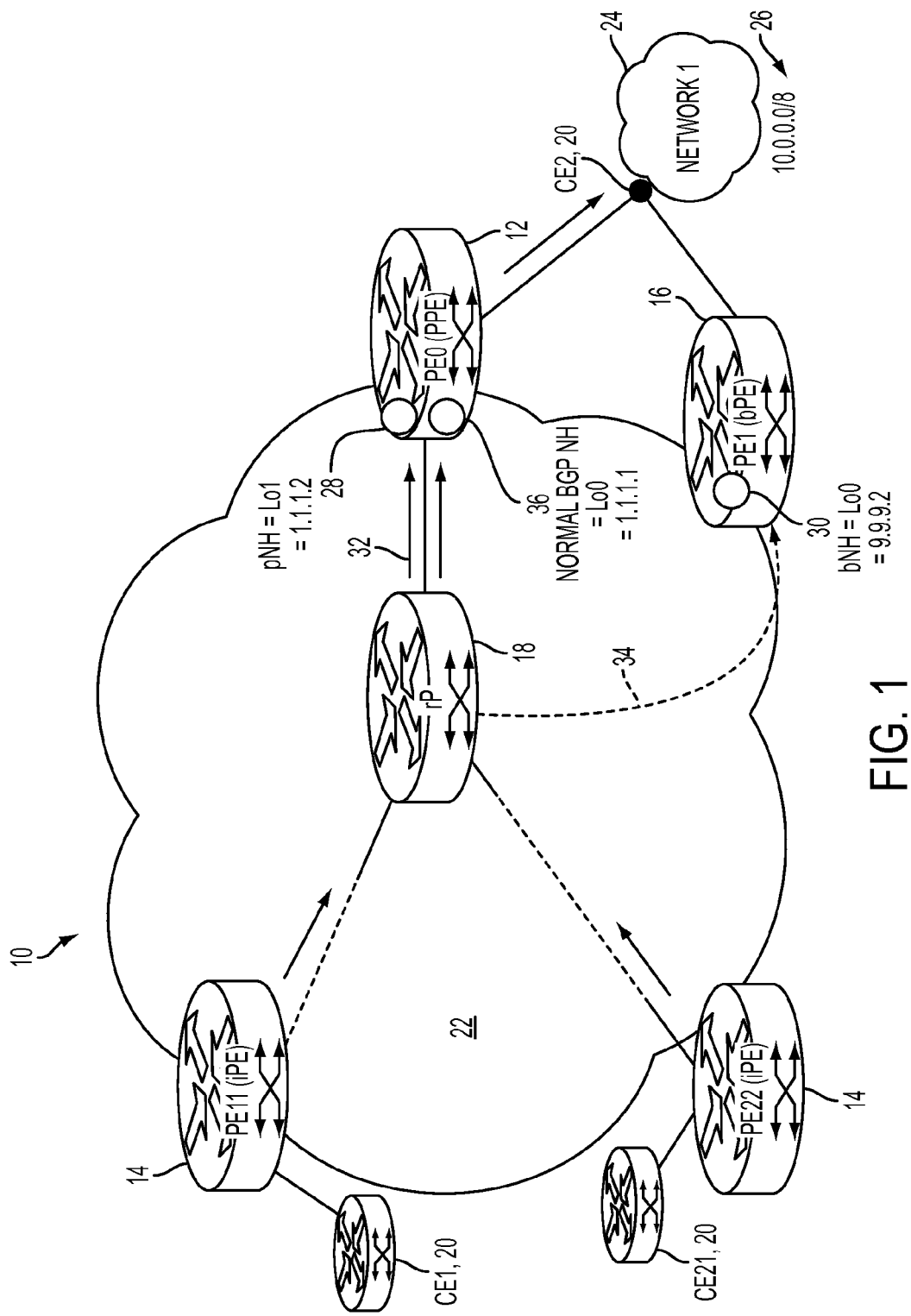
FIG. 1 illustrates an example system having BGP-enabled egress routers for sending labels for reaching a destination and repair information via BGP-free core router in a core network, enabling fast rerouting of a data packet by the core router, according to an example embodiment.

In one embodiment, a method comprises generating, by a first provider edge router associated with a first segment identifier, a primary label for reaching a destination, and repair information for reaching the destination if a second provider edge router is unavailable to reach the destination; allocating, by the first provider edge router, a first protected next-hop address associated with the first segment identifier for protected reachability to at least the destination; and sending via a core network, by the first provider edge router, an advertisement specifying the label and the repair information, enabling an ingress provider edge router to insert, into a data packet destined for the destination, the labels from the first provider edge router and the second provider edge router based on the repair information, for fast rerouting to the destination via one of the first or second provider edge router if the other is unavailable.

In another embodiment, a method comprises an ingress provider edge router receiving a first advertisement, via a core network, from a first provider edge router associated with a first segment identifier, the first advertisement specifying a label assigned by the first provider edge router and a first protected next hop address for reaching a destination via the first provider edge router, and first repair information associated with reaching the destination; the ingress provider edge router receiving a second advertisement, via the core network, from a second provider edge router associated with a second segment identifier, the second advertisement specifying a corresponding label assigned by the second provider edge router and a second protected next hop address for reaching the destination via the second provider edge router, and second repair information associated with reaching the destination; and the ingress provider edge router selecting one of the first or second provider edge routers as a primary router for reaching the destination, and selecting the other of the first or second provider edge routers as a backup router for reaching the destination; and inserting, into a data packet destined for the destination, the labels of the first and second provider edge routers and the corresponding repair information that enables a core router to reroute the data packet from the primary router to the backup router if the primary router is unavailable.

DETAILED DESCRIPTION

Particular embodiments enable a core router in a BGP-free core network to serve as a repairing core router (rP) providing connectivity between provider edge routers (PEs) that utilize BGP to tunnel traffic across the BGP-free core network. The particular embodiments also use Segment Routing (SR), described below, thereby eliminating the necessity of hop-by-hop signaling techniques, such as Resource Reservation Protocol-Traffic Engineering (RSVP-TE) (as described for example in RFC 3209, etc.) or Label Distribution Protocol (LDP) (as defined for example in RFC 5036). The particular embodiments also enable a repairing core router to execute a fast reroute of a data packet to a destination via a backup egress router either based on labels in a received data packet and forwarding semantics received in an interior gateway protocol (IGP) advertisement, or based solely on repair information in the received data packet without any additional information sent from the egress node to the core router.

FIG. 1 is a diagram illustrating an example network 10 having one or more protected Provider Edge (pPE) routers 12, one or more ingress Provider Edge (iPE) routers 14, one or more repair Provider Edge (rPE) routers 16, and one or more BGP-free core network routers 18 serving as repair routers (rP), according to an example embodiment. The repair Provider Edge (rPE) routers 16 also are referred to herein as "backup provider edge routers" (bPE) to reduce confusion with the repair routers (rP) 18. The BGP-free core network router 18 serves as a repairing core router that reroutes data traffic to a backup provider edge (rPE) router 16 if a protected Provider Edge (pPE) router 12 is unavailable. The BGP-free core network router 18 is part of a BGP-free core network 22 that does not utilize BGP protocol, but serves as a "backbone" network for edge routers 12, 14, and 16 that tunnel traffic to each other using the core network 22.

The provider edge routers 12, 14, and 16 serve as next-hop routers into and out of the core network 22 for customer edge (CE) routers 20: each customer edge (CE) router 20 can be positioned at the edge an associated external network 24 having one or more globally-distinct IPv4 and/or IPv6 address prefixes 26. Each external network 24 is a distinct Autonomous System (AS).

Hence, ingress provider edge (iPE) routers 14 can tunnel data traffic via the core network 22 based on inserting ("pushing") context-sensitive labels into each data packet: the context-sensitive labels, generated by the egress routers 12 and 16, can be implemented based on applying segment routing to multiprotocol label switching (MPLS). The egress provider edge routers 12, 16 can output context-sensitive labels for reaching destination address prefixes 26 according to BGP. For example, the PE router "PE0" 12 can generate a corresponding label (pL1) for reaching the destination "CE2" 20 serving the address prefix "10.0.0.0/8" 26, and the PE router "PE1" 16 can generate a corresponding label (pL2) for reaching the destination "CE2" 20: as described below with respect to FIGS. 8-9, the egress router 12 can be configured for using the label "pL1" as either a primary label or a backup label for reaching the destination "CE2", and the egress router 16 can be configured for using the label "pL2" as either a primary label or a backup label for reaching the destination "CE2"; alternately, the routers 12 and 16 can assign different labels for primary labels and backup labels, respectively.

Each egress router 12 and 16 also can advertise reachability to the destination "CE2" using at least one label, or alternately using a primary label for primary routing and a backup label for backup routing. The egress routers 12 and 16 can output advertisement messages advertising reachability to the destination "CE2" via the respective BGP next hop addresses (e.g., pNH=1.1.1.2; bNH=9.9.9.2) 28, 30 using the assigned labels: the egress routers 12 and 16 can output the advertisement messages as BGP Next Hop (NH) update messages (illustrated in FIG. 5), for example VPN update messages. The advertisement messages enable ingress PE routers 14 to create reachability tables for reaching the destination "CE2" 20 via any one of the egress routers 12 or 16, using the specified labels and segment identifiers associated with the egress routers.

Segment Routing (SR) enables any network node (server device, PE device, Aggregation device, core router device, etc.) to select any explicit path for each of its traffic classes. As described previously, the explicit path according to segment routing does not rely on a hop-by-hop signaling technique such as LDP or RSVP. Segment routing relies only on a set of "segments" that are advertised by the link-state routing protocol (e.g., IS-IS, OSPF) deployed in the network 10. Segments act as topological sub-paths that can be combined together to form the desired explicit path. There are two forms of segments: nodal and adjacency segments. A nodal segment represents a shortest path to a node in an interior gateway protocol (IGP) topology. An adjacency segment represents a specific adjacency to a node. A nodal segment is typically a multi-hop path while an adjacency segment is a one-hop path. Hence, each provider edge router 12, 14, 16 can have an associated segment identifier, e.g., a nodal segment identifier or an adjacency segment identifier.

Hence, the control plane of segment routing can be applied to the MPLS dataplane: a nodal segment to node N is instantiated in the MPLS dataplane as an LSP along the shortest path to the node. An adjacency segment is instantiated in the MPLS dataplane as a crossconnect entry pointing to a specific egress datalink.

As described below with respect to FIGS. 3-7, the egress routers 12 and 16 also can output advertisement messages as link state messages (illustrated in FIG. 4) specifying extended IP reachability based on specified semantics, enabling the core router 18 to implement the semantics to implement fast rerouting for any received data packet.

Hence, the repair information advertised by the egress PE routers 12 and 16 enable the ingress Provider Edge routers (iPE) (e.g., PE11 and/or PE22) 14 to insert labels (or metadata) based on the supplied repair information (described below): the inserted labels (or metadata) enable the repair PE router (rPE) 16 to execute fast rerouting to the destination "CE2" 80 via one of the PE routers (e.g., PE1 16) in the event that the other protected Provider Edge (pPE) router (e.g., PE0 12) is not available.

Consequently, the data packet can be rerouted (e.g., within a fifty (50) millisecond interval) before BGP reconvergence among the edge routers, without the risk of the rerouted data packet encountering loops. Moreover, the use of segment identifiers according to segment routing eliminates the necessity of hop-by-hop signaling techniques.

Hence, the example embodiments ensure that no router needs to copy prefixes from another router, such that only the edge router needs to store its own label for reaching the next-hop destination network, i.e., only the protected Provider Edge (pPE) router 12 and the repair PE router 16 need to store their own labels for reaching the next-hop destination network 24. Further, the BGP-free core network router 18 is not required to learn any BGP prefix, nor is the BGP-free core network router 18 required to undergo any complicated provisioning efforts; hence, the size of the forwarding and routing tables in any core router 18 is independent of the number of BGP prefixes in use by the edge routers 12, 14, 16.

Further, the choice of a primary path 32 or a backup path 34 via the core network is chosen solely by the ingress Provider Edge (iPE) router 14 according to its internal policies, and is therefore independent of the advertisements by the other routers 12 or 16. Further, the example embodiments ensure that the backup path 34 is encoded (either partially or in its entirety) in each data packet, enabling the BGP-free core network router (rP) to independently reroute the received data packet to the repairing PE router (rPE) if the protected PE router (pPE) is unavailable. Further, the example embodiments can be implemented as an improvement in existing networks without disruption, as the repair information and the primary and backup labels described herein can be advertised as "optional attributes" that can be disregarded by existing routers that cannot implement the example embodiments; in such cases, edge routers can reach a destination address prefix (e.g., "10.0.0.0/8") via a conventional BGP next hop address "1.1.1.1" 36 also advertised by the protected PE router (pPE) 12.

Each of the routers 12, 14, 16, 18, and 20 can be referred to also as "apparatus". In particular, each router (apparatus) 12, 14, 16, 18 and 20 is a physical machine (i.e., a hardware device) configured for implementing network communications with other physical machines (e.g., customer edge (CE) routers 20) via the network 10. Hence, each apparatus 12, 14, 16, 18, and 20 is a network-enabled machine implementing network communications via the network 10.

Figure 2:
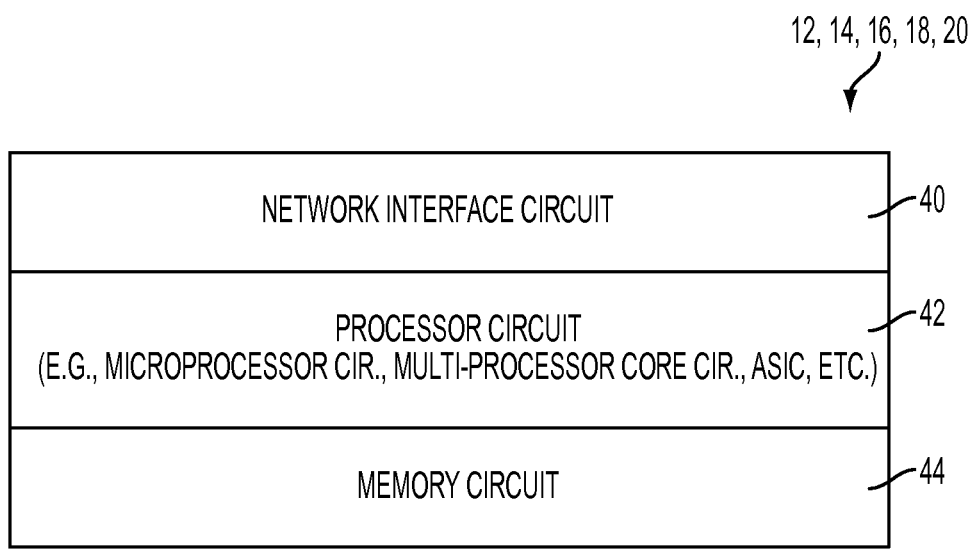
FIG. 2 illustrates an example implementation of any one of the routers of FIG. 1, according to an example embodiment.

FIG. 2 illustrates an example implementation of any one of the routers 12, 14, 16, 18, or 20 of FIG. 1, according to an example embodiment. Each of the routers 12, 14, 16, 18, or 20 can include one or more network interface circuits 40, one or more processor circuits 42, and one or more memory circuits 44.

Any of the disclosed circuits of the routers 12, 14, 16, 18, or 20 (including the network interface circuit 40, the processor circuit 42, and the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 3A:
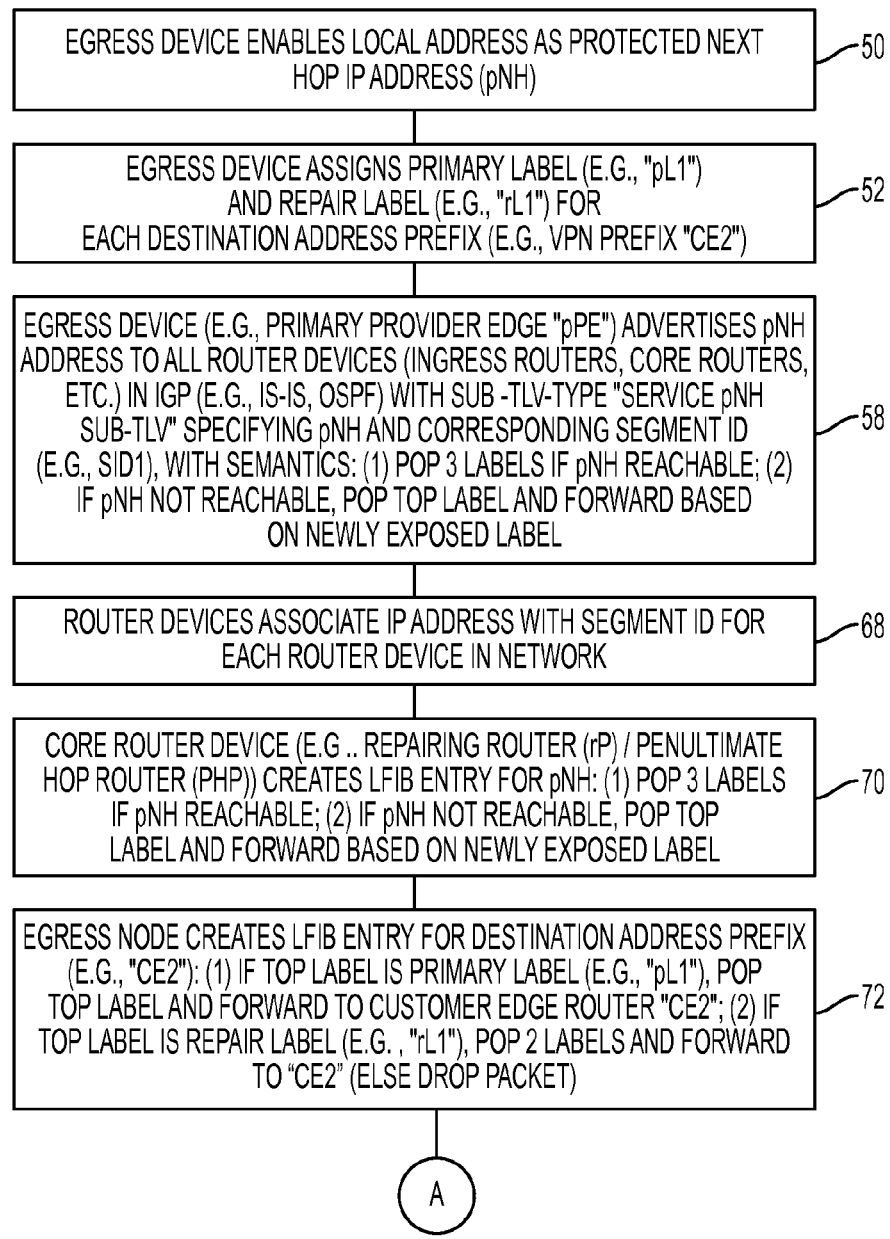
FIGS. 3A and 3B illustrate a method of an egress node sending advertisements for enabling an ingress node to insert labels for fast rerouting of a data packet if a provider edge router is unavailable, according to a first example embodiment.
Figure 3B:
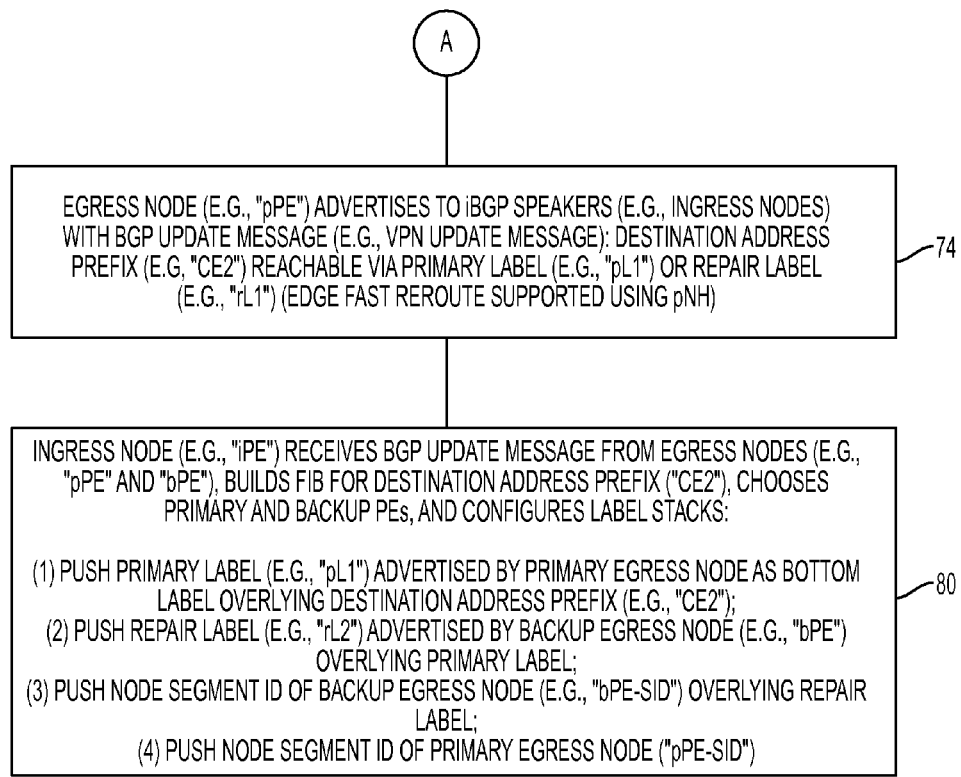

FIGS. 3A and 3B illustrate a method of an apparatus sending repair information to enable edge router insertion of labels into each data packet for rerouting by the BGP-free core router, according to an example embodiment. The operations described herein with respect to any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

FIGS. 3A and 3B illustrate a method in the network 10 of enabling an ingress provider edge router 14 to insert egress router labels based on repair information, for fast rerouting to a destination "CE2" 20, according to an example embodiment. In particular, FIGS. 3A and 3B summarize operations that enable the BGP-free core network router 18 to reroute a received data packet (82 of FIG. 7) to the backup provider edge router 16 based on the core network router 18 detecting that the protected PE router 12 is unavailable via the primary path 32.

The processor circuit 42 of an egress device (12, 16) can enable a local address as a protected next-hop IP address in operation 50. For example, the egress device "PE0" 12 can enable the address "pNH"=1.1.1.2" 28 as the protected next-hop IP address for a corresponding destination address prefix (e.g., "10.0.0.0/8") 26, and the egress device "PE1" 16 can enable the address "bNH=9.9.9.2" 30 as the protected next-hop IP address for the corresponding destination address prefix (e.g., "10.0.0.0/8") 26. The processor circuit 42 in each egress device 12, 16 in operation 52 can assign a primary label 54 and a backup label 56, illustrated in FIG. 5, for each destination address prefix 26, illustrated for example as the destination "CE2" 20. For example, the egress device 12 can assign a primary label "pL1" 54 and a backup label (i.e., repair label) "rL1" 56 for the destination address prefix "10.0.0.0/8" 26 reachable via the destination customer edge router "CE2" 20. As described below, the labels are advertised to the ingress provider edge routers 14 to enable insertion into a data packet.

Figure 4:
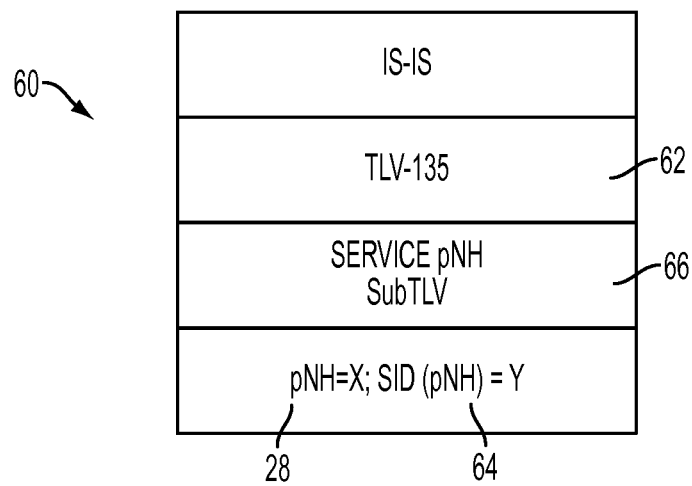
FIG. 4 illustrates an example link state message output by an egress node according to the first example embodiment of FIG. 3A.

The processor circuit 42 of each egress device 12 and 16 in operation 58 also can advertise protected next-hop address to all the router devices within an interior gateway protocol (IGP) advertisement message 60, illustrated in FIG. 4. The IGP advertisement message 60 can be a link state data packet (e.g., IS-IS or OSPF) that can include a type-length-value (TLV) element 62 identifying an extended service option: for example, the TLV element 62 can identify an "extended IP reachability" within an IS-IS data packet (TLV-135). The IGP advertisement message 60 also can specify the protected next hop address (e.g., 28 for PE0), and a corresponding segment identifier 64 that specifies the segment ID used to reach the protected next hop address specified in the advertisement message 60. The advertisement message 60 also can specify semantics 66 as part of the extended service option 62: the semantics 66 describe the operations to be performed with respect to the protected next hop address 28. Hence, flooding of the advertisement message 60 by the network interface circuit 40 of the egress device (12, 16) enables any router device (e.g., any ingress PE 14, any core router 18, etc.) to associate in operation 68 of FIG. 3A the protected next hop address 28 with the segment identifier 64 for use in Segment Routing.

The advertisement message 60 also enables the core router 18 in operation 70 to create label forwarding information base (LFIB) entries to route a data packet based on the semantics 66. The core router 18 creating the LFIB entries is typically the penultimate hop (PHP) router for the egress node 12 (i.e., a router in the core network 22 that is one hop away from the egress node 12), although another core router 18 can be used as a repairing core router (rP) to execute the fast reroute operations described herein. In particular, the semantics 66 enable the repairing core router device 18 to create in its memory circuit 44 an LFIB entry for the corresponding protected next hop address specified in the advertisement message, specifying that the core router device 18 should pop three labels of a received data packet if the protected next hop address is reachable; if the protected next hop address is not reachable, then the core router device 18 should pop the top label and forward the data packet based on the newly exposed label. The core router operations based on the LFIB entry generated in response to the advertisement 60 are described in further detail below with respect to FIG. 7.

The egress node 12, 16 in operation 72 also can create an LFIB entry for the destination address prefix, illustrated as the destination "CE2" 20, namely: (1) if the top label is the primary label (e.g., "pL1" 54a of FIG. 7), then the egress node (e.g., PE0) should pop the top label ("pL1") and forward the data packet (82 of FIG. 7) to the destination customer edge router "CE2" 20; if the top label is the repair label (e.g., "rL1") 56, then the egress node (e.g., PE0) should pop two labels (namely, the repair label and the primary label of the unavailable edge router) and forward the data packet (82 of FIG. 7) to the destination customer edge router "CE2".

Figure 5:
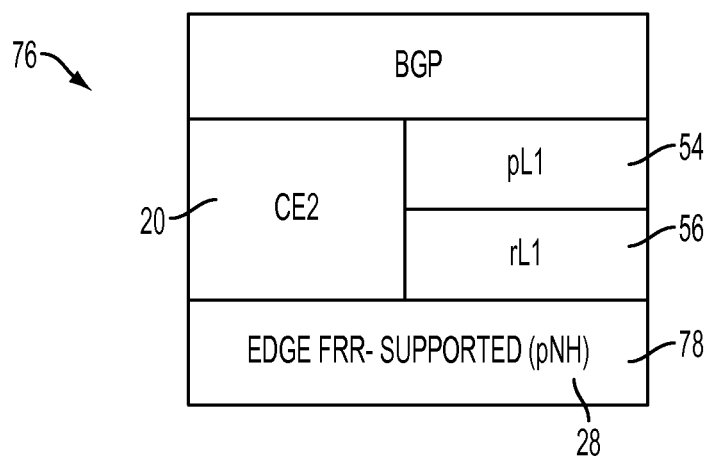
FIG. 5 illustrates an example BGP update message output by an egress node according to an example embodiment.

Referring to FIG. 3B, the processor circuit 42 of the egress node (e.g., 12) generates in operation 74 a BGP advertisement message 76, illustrated in FIG. 5. The BGP advertisement message 76, implemented for example as a BGP update message (e.g., a VPN update message) is output and sent by the network interface circuit 40 of the egress router 12 to the internal BGP (iBGP) peers, or iBGP "speakers" such as the ingress nodes 14. As illustrated in FIG. 5, the BGP advertisement message 76 generated by the processor circuit 42 identifies the destination "CE2" 20 is reachable via the primary label "pL1" 54, also referred to as the "application label" or "VPN label". The BGP advertisement message 76 also specifies repair information in the form of the repair label 56 and a new BGP attribute field 78 indicating that edge fast rerouting is supported using the protected next hop address 28. Hence, the BGP advertisement message 76 can be sent as part of a BGP VPN update message.

The processor circuit 42 of an ingress edge node 14 in operation 80 can create in its corresponding memory circuit 44 a forwarding information base (FIB) entry in response to the corresponding network interface circuit 40 receiving the BGP advertisement message 76 from the egress provider edge device 12 via the core network 22. The forwarding information base table entry can specify that the the destination address prefix "CE2" 20 is reachable via the protected next hop address (pNH) 28 of the egress router "PE0" 12, using either the primary label "pL1" 54 (if egress router "PE0" is the primary router for reaching the destination) or the backup label "rL1" 56 (if the egress router "PE0" is to be the backup router for reaching the destination if another primary router is unavailable to reach the destination).

The ingress provider edge router 14 also can receive a second advertisement message 76 from the provider edge router "PE1" 16 specifying the destination address prefix "CE2" 20 is reachable by the protected next hop address (bNH) 30 using either a primary label (e.g., "pL2") 54 or a backup label (e.g., "rL2") 56. The ingress provider edge router 14 also can receive a corresponding advertisement 60 (described above with respect to operations 58 and 68) that enables the ingress provider edge router 14 to associate the protected next hop address (bNH) 30 of the provider edge router "PE1" 16 with a corresponding segment identifier for segment routing.

Hence, the processor circuit 42 of the ingress provider edge router 14, in response to receiving the BGP update messages 76 from the provider edge routers 12 and 16, can add into the FIB entry that the destination "CE2" is reachable via the protected next hop address "pNH" 28 (using the primary label "pL1" 54 or backup label "rL1" 56), or reachable via the protected next hop address "bNH" 30 (using the primary label "pL2" 54 or backup label "rL2" 56). The processor circuit 42 of the ingress provider edge router 14 also can select one of the provider edge routers 12 or 16 as a primary router for reaching the destination "CE2" 20: assuming the processor circuit 42 of the ingress provider edge router 14 selects the provider edge router "PE0" 12 as the primary router for reaching the destination "CE2" 12, the processor circuit 42 of the ingress provider edge router 14 also can select the other provider edge router "PE1" as a backup router for reaching the destination "CE2" 20.

Figure 7:
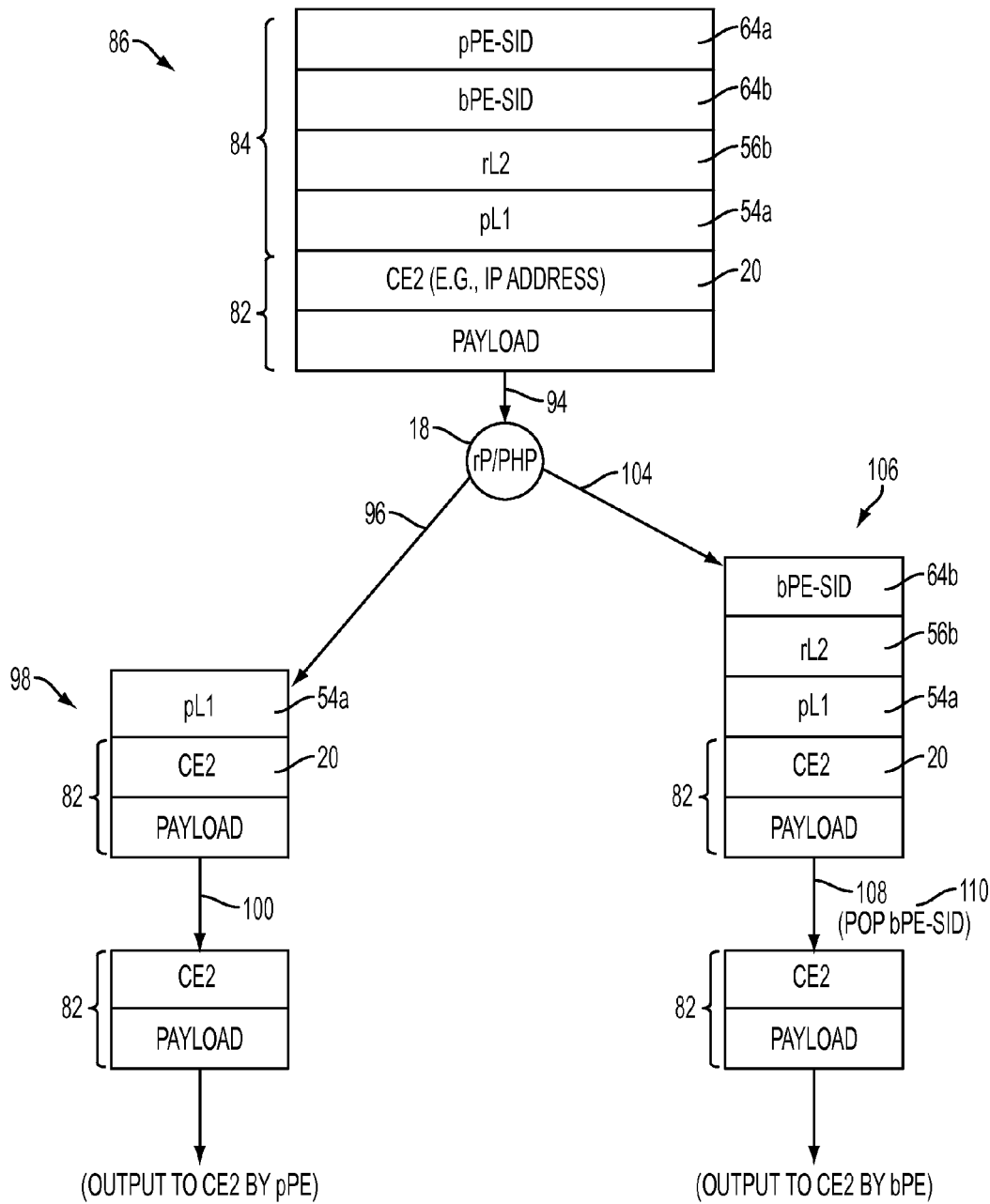
FIG. 7 illustrates another example of labels inserted into a data packet during transmission via the core network of FIG. 1, according to the first example embodiment of FIGS. 3-6.

As illustrated with respect to FIG. 7, the processor circuit 42 of the ingress provider edge router 14 in operation 80 can configure its forwarding table entries to specify that a received data packet (e.g., from a customer premises router "CE1" 20) 82 should be processed by inserting (i.e, pushing) labels 84 in a prescribed sequence, for example pushing the primary label "pL1" 54a of the primary PE router "pPE" 12 as the bottom label overlying the received data packet 82, pushing the repair label "rL2" 56b of the backup PE router "bPE" 16 overlying the primary label "pL1" 54a, pushing the node segment identifier ("bPE-SID") 64b of the backup PE router "bPE" 16 overlying the repair label 56b, and pushing the node segment identifier ("pPE-SID") 64a of the primary PE router "pPE" 12 overlying the node segment identifier 64b.

Figure 6:
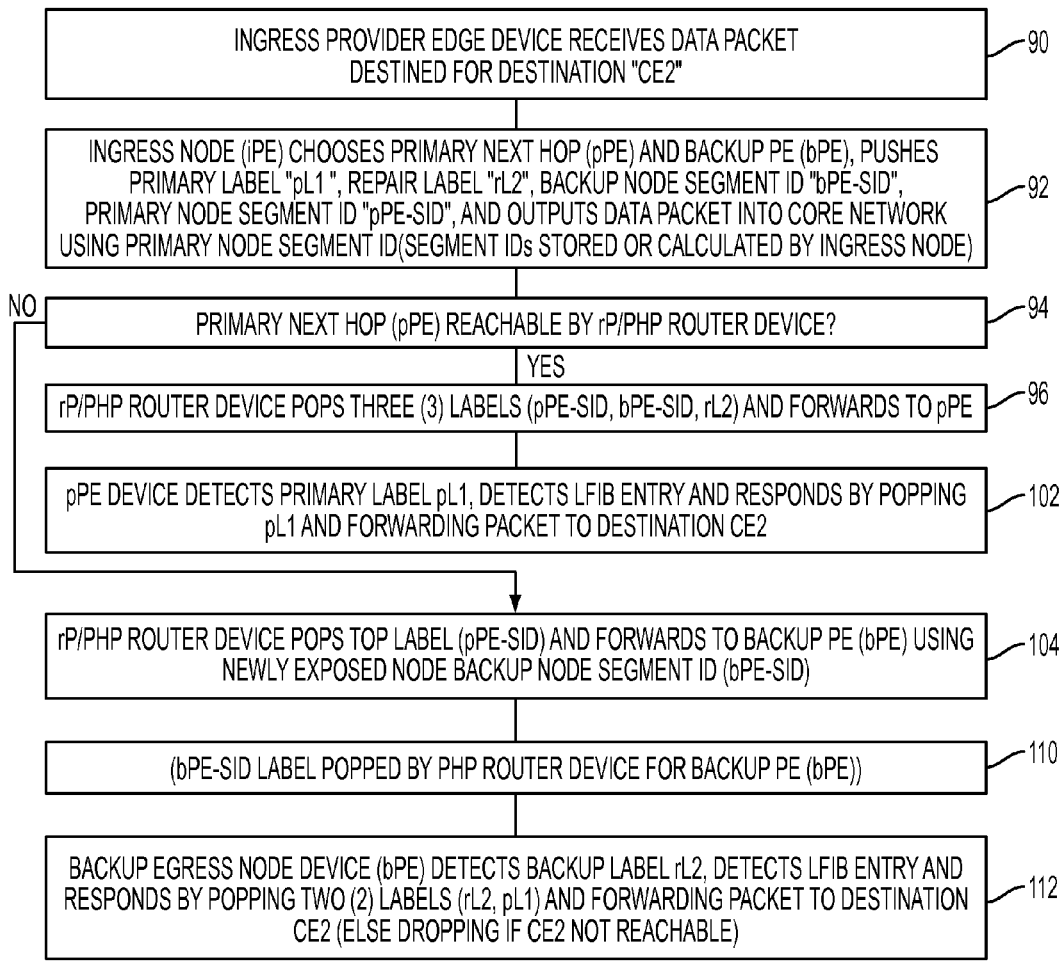
FIG. 6 illustrates an example method of generating and forwarding of a data packet by the ingress node, core router, and available egress node of FIG. 1, according to the first example embodiment of FIGS. 3-5.

FIG. 6 illustrates an example method of forwarding a data packet 86 based on pushing labels 84 overlying a received data packet 82, according to an example embodiment. The ingress provider edge device 14 receives an operation 90 a data packet 82 from a local consumer edge router (e.g., "CE1" 20) that is destined for an identified destination "CE2" 20. In response to accessing its forwarding information base table entry for the destination address 20 from its memory circuit 44, the processor circuit 42 of the ingress provider edge device 14 can choose in operation 92 its primary provider edge router (e.g., "pPE") 12 and backup provider edge router (e.g., "bPE") 16, and push the labels 84 as described previously with respect to operation 80, namely push the primary label "pL1" 54a, the repair label "rL2" 56b, the backup node segment identifier 64b, and the primary node segment identifier 64a. The network interface circuit 40 can output in 92 the modified data packet 86 into the core network 22 using the primary node segment identifier 64a. According to an example embodiment, the segment identifiers 64a and 64b can either be stored statically in response to the link state messages 60, or calculated dynamically based on the known parameters for the segment identifiers 64 according to segment routing.

In response to the network interface circuit 40 of the core router (e.g., the penultimate hop (PHP) device) 18 receiving in operation 94 the data packet 86, the processor circuit 42 of the core router 18 determines whether the primary next hop address (pNH) 28 is reachable for delivery of the data packet to the primary Provider Edge node "pPE" 12. If the processor circuit 42 of the core router 18 determines the primary provider edge router 12 is available, the processor circuit 42 of the core router 18 in operation 96 can execute the semantics of operation 58, namely popping the label specifying the segment identifier 64a for the primary provider edge router 12, the label specifying the segment identifier 64b for the backup provider edge router 16, and the repair label 56b underlying label 64b and overlying the primary label 54a, and outputting the resulting data packet 98 to the primary provider edge router 12 via the primary path 32 of FIG. 1 in operation 100.

In response to the network interface circuit 40 of the primary provider edge router 12 receiving the data packet 98, if the processor circuit 42 of the primary provider edge router 12 detects the primary label 54a as the top label of the data packet 98, the primary provider edge router 12 can execute its LFIB entry of operation 72 based on popping in operation 102 the top label 54a, and forwarding the original data packet 82 to the destination "CE2" in operation 100.

If in operation 94 the processor circuit 42 of the core router 18 determines that the primary provider edge router 12 is not available, the core router 18 in operation 104 executes the semantics of operation 58 based on popping the top label 64a and forwarding in operation 108 the modified data packet 106 via the backup path 34 of FIG. 1 to the backup egress router 16. Although the penultimate hop router (PHP) for the backup provider edge device 16 is not shown in FIG. 1, the PHP router device that is directly connected to the backup provider edge device 16 can pop in operation 110 the node segment identifier label ("bPE-SID") 64b of the backup PE router "bPE" 16 from the data packet 106 prior to delivery to the backup egress node device 16 (alternately, another device can pop the label 64b, for example the backup PE router 16 can pop the label 64b itself).

In response to the network interface circuit 40 of the backup PE device 16 receiving the data packet 106 (minus the segment label 64b), the corresponding processor circuit 42 of the backup PE device 16 can detect the repair label 56b, and in response determine from its LFIB entry (described with respect to operation 72 in FIG. 3A) that it should pop the top label 56b and the primary label 54a of the primary PE router 12 underlying the repair label 56b in operation 112, and forward the data packet 82 to the destination "CE2" 20. If the backup PE 16 determines that the destination "CE2" 20 is not reachable, then the backup PE 16 can drop the packet to ensure that no loops are formed.

According to the example embodiment of FIGS. 3-7, and egress node can advertise its protected next hop address with all the associated detected VPN prefixes 26 along with existing BGP update messages, and can advertise its protected next hop address as a new sub-TLV in link state advertisement message with semantics for forwarding a data packet. Hence, the example embodiments as described above can drastically reduce the number of state entries required in a penultimate hop router, and eliminates the need for a primary egress router 12 to assign vector labels, or to re-advertise BGP update messages. Hence, fast reroute operations can be executed by a core router with minimal processing requirements.

Figure 8:
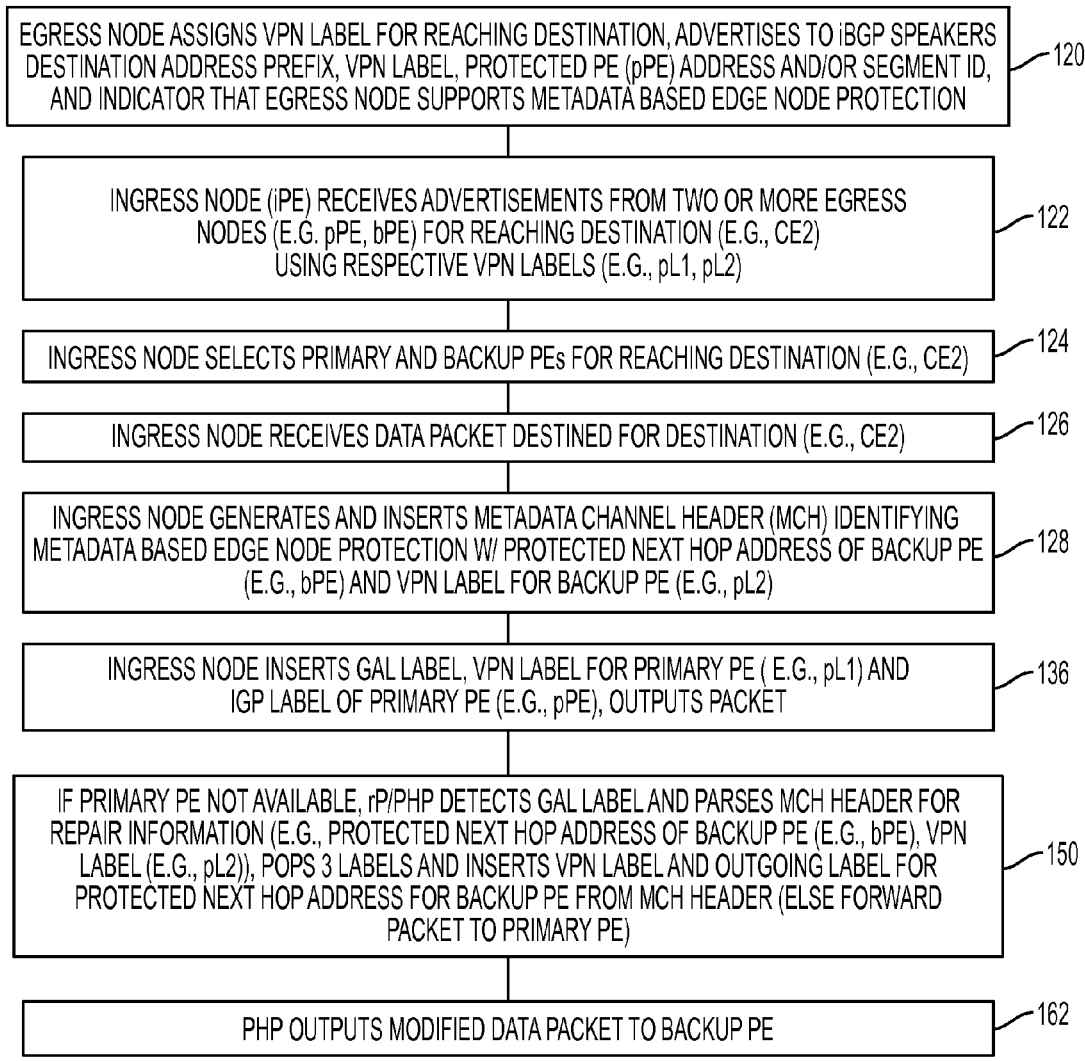
FIG. 8 illustrates a method of providing fast rerouting based on an ingress router inserting repair metadata describing fast reroute parameters, according to an example embodiment.
Figure 9:
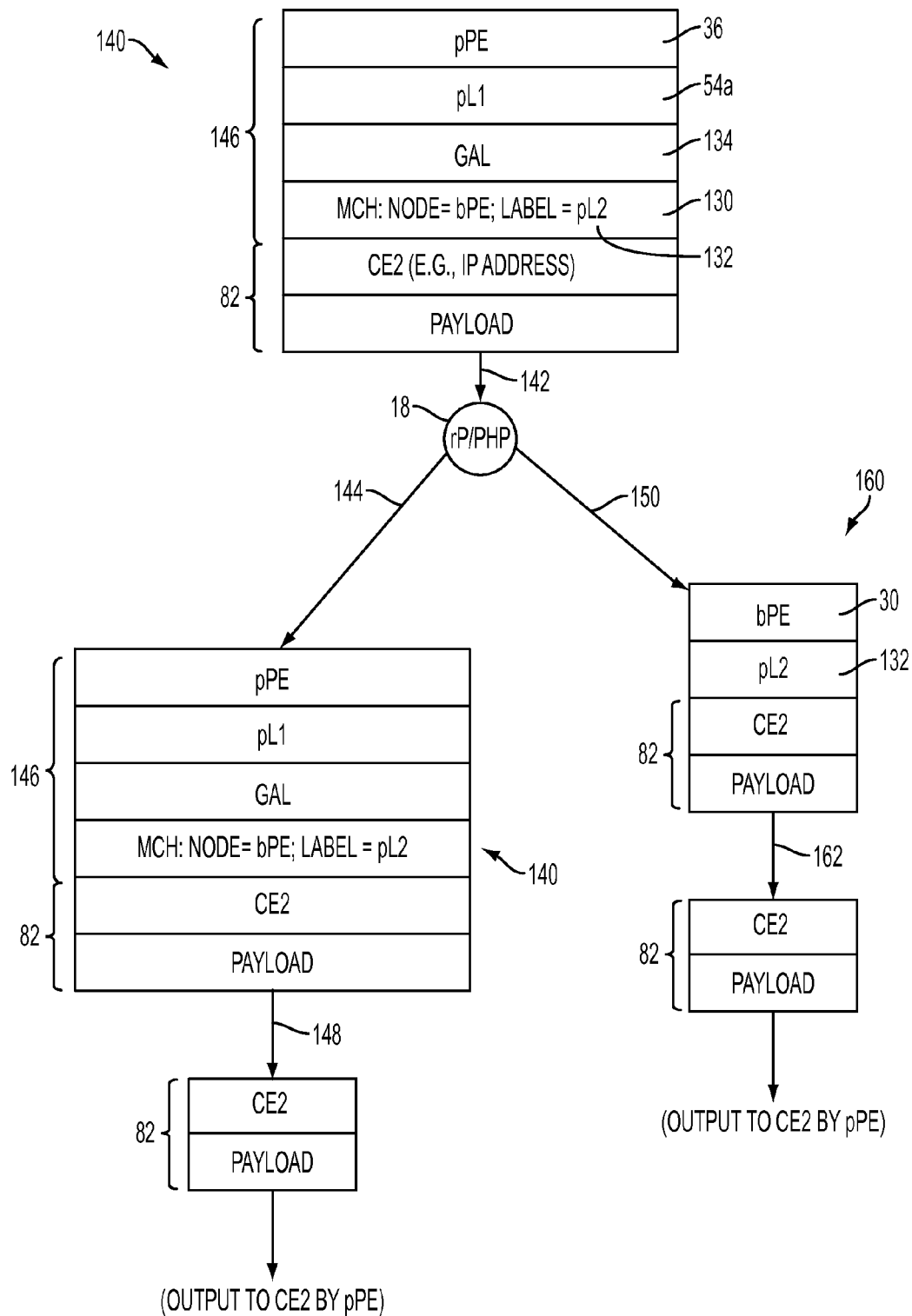
FIG. 9 illustrates the insertion of repair metadata, and insertion of fast reroute labels in response to a determined unavailability of a primary provider edge router, according to an example embodiment.

FIGS. 8 and 9 illustrate segment routing-based distribution of advertisement messages that enable fast rerouting to a destination based on metadata within a data packet, according to a second example embodiment. As described in further detail below, the processor circuit 42 in each egress provider edge router 12 or 16 can output an advertisement message to the ingress PE routers 14 that is similar to the advertisement message 76 of FIG. 5. In particular, the advertisement message 76 output according to this second example embodiment can specify at least one primary label 54 for reaching a destination prefix 26, illustrated in FIG. 5 as the destination "CE2". As described below, the processor circuit 42 in the egress provider edge router 12 or 16 also can optionally specify a repair label 56. A segment identifier 64 also can be distributed throughout the network 10 (distinct from the advertisement 76), providing reachability to any network device based on its associated segment identifier.

According to the second example embodiment, the repair information 78 specified in the advertisement 76 indicates that the provider edge router supports metadata-based edge node protection, enabling a core router 18 to reroute a data packet solely based on the repair information in the data packet (i.e., without relying on accessing any forwarding tables within the core router). Hence, an ingress router 14 can implement multiprotocol label switching (MPLS) based segment routing edge node protection based on inserting metadata into a received data packet.

Referring to FIG. 8, an egress node 12, 16 can assign in operation 120 a VPN label (54 of FIG. 5) for reaching a destination 20, and advertise to its iBGP speakers 14 an advertisement 76 including at least the destination address prefix 20, the VPN label 54, the protected PE address 28 and/or the segment identifier, and the repair information 78 indicating that the egress node 12, 16 supports metadata-based edge node protection. The advertisement 76 generated in operation 120 optionally can also include a repair label 56. In response to an ingress provider edge router 14 receiving in operation 122 advertisements 76 from two or more egress nodes (e.g., "PE0" 12 and "PE1" 16) specifying respective VPN labels for reaching the same destination 20, the processor circuit 42 of the ingress nodes 14 in operation 124 can select primary and backup egress routers for reaching the destination 20.

In response to a network interface circuit 40 of the ingress PE 14 receiving in operation 126 a data packet (82 of FIG. 9), the processor circuit 42 of the ingress PE 14 in operation 128 can generate a metadata channel header (MCH) 130. The metadata channel header 130 identifies metadata-based edge node protection, and can include the protected next hop address 30 for the backup provider edge router 16 and the corresponding label assigned by the backup provider edge router 16: if the backup provider edge router 16 advertises both a primary label 54 and a backup label 56 as illustrated in FIG. 5, the metadata channel header 130 can specify the backup label 56; alternately, if the backup provider edge router 16 advertises only a primary label 54, the metadata channel header 130 can specify the primary label 54 used by the backup provider edge router 16. Hence, the metadata channel header 130 specifies the protected next hop address 30 of the backup provider edge router 16, and the corresponding label 132 assigned by the backup provider edge router 16. The processor circuit 42 of the ingress PE 14 also can push a generic associated channel label (GAL) 134 that identifies the presence of the metadata channel header 130 providing metadata-based fast reroute protection.

The processor circuit 42 of the ingress PE 14 also can insert in operation 136 the corresponding VPN label 54a assigned by the primary PE router 12 overlying the GAL label 134 and the metadata channel header 130. The processor circuit 42 of the ingress PE also can insert in operation 136 the IGP label (egress label) for the protected next hop address 28 of the primary PE 12, and output the modified data packet 140 into the core network 20 for delivery to the destination 20.

In response to the penultimate hop router 18 receiving in operation 142 the data packet 140, the processor circuit 42 of the core router 18 can forward the data packet 140 unchanged in operation 144 if the PHP router 18 determines the primary PE router 12 is available. In response to the processor circuit of the primary PE router 12 detecting the primary label 54a (and the GAL label 134 if no repair label 56 is used), the processor circuit 42 of the primary PE 12 can pop the routing labels 146 and output in operation 148 the original data packet 82 to the destination 20.

Assuming after operation 142 that the processor circuit 42 of the PHP router 18 detects that the primary PE 12 is not available in operation 150, the processor circuit 42 of the PHP router 18 can detect in operation 150 the GAL label 134 and in response parse the MCH header 130 for the repair information. In particular, the processor circuit of the PHP router 18 can retrieve the protected next hop address 30 of the backup PE 16 from the MCH header 130, and the VPN label 132 specified in the MCH header 130, pop the top labels 146, and insert the VPN label 132 and the IGP outgoing label for the protected next hop address 30 of the backup PE router 16. The modified data packet 160 can be output by the network interface circuit 40 of the core router 18 in operation 162 for delivery to the backup PE router 16.

In response to the backup PE router 16 receiving the modified data packet 160, the processor circuit 42 of the backup PE 16 can pop the address label 30, and determine from the label 132 that the one label 132 should be popped and the resulting data packet 82 should be forwarded to the destination "CE2" 20. As described previously, if only one label (54 of FIG. 5) is used to identify a destination 20, the egress PE can also determine whether additional metadata (130, 134) needs to be removed prior to outputting the final data packet 82; if a repair label (56 of FIG. 5) is used to distinguish from a primary label (54 of FIG. 5), the egress PE can enter forwarding entries to specify that the added labels 146 should be popped in response to detecting a primary label prior to forwarding to the destination 20, else if a backup label is detected then pop only the backup label prior to forwarding the data packet 82 to the destination 20.

According to the second example embodiment, and MPLS-based segment routing can employ edge node protection based on adding metadata to a data packet. Hence, no additional addresses need to be advertised in the IGP core by egress nodes or by core nodes 18. Further, the example embodiments can implement fast reroute protection without hop by hop configuration schemes such as label distribution protocol.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
    generating, by a first provider edge router associated with a first segment identifier and positioned at a first edge of a core network, a primary multiprotocol label switching (MPLS) label for reaching a destination outside the core network, and repair information for reaching the destination if a second provider edge router positioned at a second edge of the core network is unavailable to reach the destination outside the core network;
    allocating, by the first provider edge router, a first protected next-hop address associated with the first segment identifier for protected reachability to at least the destination, and advertising in the core network that the first protected next-hop address is reachable via the first segment identifier; and
    sending via the core network, by the first provider edge router, an advertisement specifying the primary MPLS label and the repair information, enabling an ingress provider edge router positioned at a third edge of the core network to insert, into a data packet destined for the destination, one of the primary MPLS label from the first provider edge router and the corresponding repair information from the second provider edge router, or the corresponding primary MPLS label from the second provider edge router and the repair information from the first provider edge router, for MPLS-based multi-hop segment routing of the data packet and fast rerouting of the data packet to the destination via one of the first or second provider edge router if the other is unavailable.

2. The method of claim 1, further comprising outputting a second advertisement enabling a BGP-free core network router in the core network to route the data packet to one of the first or second provider edge routers based on semantics specified in the second advertisement.

3. The method of claim 2, wherein:
    the primary MPLS label generated by the first provider edge router is for reaching a corresponding virtual private network (VPN) address prefix at the destination;
    the core network router is a penultimate hop router for the first provider edge router;

the semantics cause the core network router to expose, in the data packet, the primary MPLS label if the first provider edge router is available;

the semantics further causing the core network router to expose, in the data packet, a label specifying a second segment identifier associated with the second provider edge router if the first provider edge router is unavailable.

4. The method of claim 3, wherein the semantics further cause the core network router to expose the primary MPLS label if the first provider edge is available based on:

popping a label specifying the first segment identifier and used for the multi-hop segment routing of the data packet from the ingress provider edge router to the core network router via the core network;

popping a label specifying the second segment identifier underlying the label specifying the first segment identifier; and popping the repair information, implemented as an MPLS repair label, underlying the label specifying the second identifier and overlying the primary MPLS label.

5. The method of claim 2, wherein the second advertisement is flooded in the core network, the second advertisement specifying the first protected next-hop address, the first segment identifier, and the semantics as an extended service option of a link state data packet, the second advertisement enabling any router device to associate the first protected next-hop address with the first segment identifier.

6. The method of claim 1, further comprising:

the first provider edge router receiving a data packet generated by the ingress provider edge router;

in response to the first provider edge router detecting the primary MPLS label of the first provider edge router as a top label of the data packet, the first provider edge router popping the top label and forwarding the data packet to the destination;

in response to the first provider edge router detecting the repair information from the first provider edge router as the top label, popping the top label and the primary MPLS label of the second provider edge router, underlying the top label, from the data packet and forwarding the data packet to the destination.

7. The method of claim 1, wherein the repair information enables the ingress provider edge router to insert repair metadata identifying the one provider edge router if the other provider edge router is unavailable, the repair metadata identifying one of an Internet Protocol (IP) address or the first segment identifier for reaching the one provider edge router, and an MPLS repair label used by the one provider edge router for reaching the destination.

8. A method comprising:

receiving, by an ingress provider edge router positioned at a first edge of a core network, a first advertisement via the core network from a first provider edge router associated with a first segment identifier and positioned at a second edge of the core network, the first advertisement specifying a primary multiprotocol label switching (MPLS) label assigned by the first provider edge router and a first protected next hop address for reaching a destination outside the core network via the first provider edge router, and first repair information associated with reaching the destination;

receiving by the ingress provider edge router, via the core network, a second advertisement from a second provider edge router associated with a second segment identifier and positioned at a third edge of the core network, the second advertisement specifying a corresponding primary MPLS label assigned by the second provider edge router and a second protected next hop address for reaching the destination outside the core network via the second provider edge router, and second repair information associated with reaching the destination; and selecting, by the ingress provider edge router, one of the first or second provider edge routers as a primary router for reaching the destination, and selecting the other of the first or second provider edge routers as a backup router for reaching the destination; and inserting, into a data packet destined for the destination, the corresponding primary MPLS label of the primary router and the corresponding segment identifier, and the corresponding repair information of the backup router and the corresponding segment identifier, for MPLS-based multi-hop segment routing of the data packet that enables a core router in the core network to fast reroute the data packet from the primary router to the backup router if the primary router is unavailable.

9. The method of claim 8, wherein:

the primary MPLS label assigned by the first provider edge router is a virtual private network (VPN) label for reaching a corresponding address prefix at the destination via the first provider edge router;

the first repair information includes a backup MPLS label for reaching the corresponding address prefix associated with the VPN label if the primary router is not available;

the label assigned by the second provider edge router is a corresponding primary MPLS label for reaching the corresponding address prefix at the destination via the second provider edge router;

the second repair information specifies that fast reroute to the destination is supported via the second protected next hop address of the second provider edge router if the primary router is not available.

10. The method of claim 9, wherein the inserting includes:

inserting the VPN label overlying a destination address for the destination and payload for the data packet;

inserting the backup label overlying the VPN label;

inserting the second segment identifier overlying the backup label; and inserting the first segment identifier overlying the second segment identifier, enabling the core router to reroute the data packet to the backup router based on popping the first segment identifier and forwarding the resulting data packet to the backup router based on the second segment identifier.

11. The method of claim 8, wherein the first repair information and the second repair information identify the respective first and second provider edge routers support metadata based edge node protection, enabling the core router to reroute the data packet solely based on the repair information in the data packet.

12. The method of claim 11, wherein the inserting includes:

generating a metadata channel header identifying the metadata based edge node protection, the metadata channel header including the second protected next hop address for the second provider edge router as the backup router, and the corresponding label assigned by the second provider edge router;

inserting the metadata channel header overlying a destination address for the destination and payload for the data packet;

inserting the corresponding label assigned by the first provider edge router as the primary router, overlying the metadata channel header; and inserting the first protected next hop address, overlying the label assigned by the first provider edge router, for routing via the core network to the first provider edge router.

13. Logic encoded in one or more non-transitory tangible media for execution by a machine and when executed by the machine operable for:

generating, by a first provider edge router associated with a first segment identifier and positioned at a first edge of a core network, a primary multiprotocol label switching (MPLS) label for reaching a destination outside the core network, and repair information for reaching the destination if a second provider edge router positioned at a second edge of the core network is unavailable to reach the destination outside the core network;

allocating, by the first provider edge router, a first protected next-hop address associated with the first segment identifier for protected reachability to at least the destination, and advertising in the core network that the first protected next-hop address is reachable via the first segment identifier; and sending via the core network, by the provider edge router, an advertisement specifying the primary MPLS label and the repair information, enabling an ingress provider edge router positioned at a third edge of the core network to insert, into a data packet destined for the destination, one of the primary MPLS label from the first provider edge router and the corresponding repair information from the second provider edge router, or the corresponding primary MPLS label from the second provider edge router and the repair information from the first provider edge router, for MPLS-based multi-hop segment routing of the data packet and fast rerouting of the data packet to the destination via one of the first or second provider edge router if the other is unavailable.

14. The logic of claim 13, further operable for outputting a second advertisement enabling a BGP-free core network router in the core network to route the data packet to one of the first or second provider edge routers based on semantics specified in the second advertisement, wherein:

the primary MPLS label generated by the first provider edge router is for reaching a corresponding virtual private network (VPN) address prefix at the destination;

the core network router is a penultimate hop router for the first provider edge router;

the semantics cause the core network router to expose, in the data packet, the primary MPLS label if the first provider edge router is available;

the semantics further causing the core network router to expose, in the data packet, a label specifying a second segment identifier associated with the second provider edge router if the first provider edge router is unavailable.

15. The logic of claim 13, wherein the repair information enables the ingress provider edge router to insert repair metadata identifying the one provider edge router if the other provider edge router is unavailable, the repair metadata identifying one of an Internet Protocol (IP) address or the first segment identifier for reaching the one provider edge router, and an MPLS repair label used by the one provider edge router for reaching the destination.

16. An apparatus comprising:
a processor circuit configured for:
identifying the apparatus as a first provider edge router associated with a first segment identifier and positioned at a first edge of a core network, generating a primary multiprotocol label switching (MPLS) label for reaching a destination outside the core network, and generating repair information for reaching the destination if a second provider edge router positioned at a second edge of the core network is unavailable to reach the destination outside the core network, and allocating, by the first provider edge router, a first protected next-hop address associated with the first segment identifier for protected reachability to at least the destination; and a network interface circuit configured for sending via the core network an advertisement specifying the label and the repair information and advertising in the core network that the first protected next-hop address is reachable via the first segment identifier, the advertisement enabling an ingress provider edge router positioned at a third edge of the core network to insert, into a data packet destined for the destination, one of the primary MPLS label from the first provider edge router and the corresponding repair information from the second provider edge router, or the corresponding primary MPLS label from the second provider edge router and the repair information from the first provider edge router, for MPLS-based multi-hop segment routing of the data packet and fast rerouting of the data packet to the destination via one of the first or second provider edge router if the other is unavailable.

17. Logic encoded in one or more non-transitory tangible media for execution by a machine and when executed by the machine operable for:

receiving, by an ingress provider edge router positioned at a first edge of a core network, a first advertisement via the core network from a first provider edge router associated with a first segment identifier and positioned at a second edge of the core network, the first advertisement specifying a primary multiprotocol label switching (MPLS) label assigned by the first provider edge router and a first protected next hop address for reaching a destination outside the core network via the first provider edge router, and first repair information associated with reaching the destination;

receiving by the ingress provider edge router, via the core network, a second advertisement from a second provider edge router associated with a second segment identifier and positioned at a third edge of the core network, the second advertisement specifying a corresponding primary MPLS label assigned by the second provider edge router and a second protected next hop address for reaching the destination outside the core network via the second provider edge router, and second repair information associated with reaching the destination;

selecting, by the ingress provider edge router, one of the first or second provider edge routers as a primary router for reaching the destination, and selecting the other of the first or second provider edge routers as a backup router for reaching the destination; and inserting, into a data packet destined for the destination, corresponding primary MPLS label of the primary router and the corresponding segment identifier, and the corresponding repair information of the backup router and the corresponding segment identifier, for MPLS-based multi-hop segment routing of the data packet that enables a core router in the core network to fast reroute the data packet from the primary router to the backup router if the primary router is unavailable.

18. The logic of claim 17, wherein:
the primary MPLS label assigned by the first provider edge router is a virtual private network (VPN) label for reaching a corresponding address prefix at the destination via the first provider edge router;
the first repair information includes a backup MPLS label for reaching the corresponding address prefix associated with the VPN label if the primary router is not available;
the label assigned by the second provider edge router is a corresponding primary MPLS label for reaching the corresponding address prefix at the destination via the second provider edge router;
the second repair information specifies that fast reroute to the destination is supported via the second protected next hop address of the second provider edge router if the primary router is not available.

19. The logic of claim 17, wherein the first repair information and the second repair information identify the respective first and second provider edge routers support metadata based edge node protection, enabling the core router to reroute the data packet solely based on the repair information in the data packet.

20. An apparatus comprising:
a network interface circuit configured for receiving a first advertisement, via a core network, from a first provider edge router associated with a first segment identifier and positioned at a first edge of the core network, the first advertisement specifying a primary multiprotocol label switching (MPLS) label assigned by the first provider edge router and a first protected next hop address for reaching a destination outside the core network via the first provider edge router, and first repair information associated with reaching the destination, the network interface circuit further configured for receiving a second advertisement, via the core network, from a second provider edge router associated with a second segment identifier and positioned at a second edge of the core network, the second advertisement specifying a corresponding primary MPLS label assigned by the second provider edge router and a second protected next hop address for reaching the destination outside the core network via the second provider edge router, and second repair information associated with reaching the destination; and
a processor circuit configured for selecting one of the first or second provider edge routers as a primary router for reaching the destination, and selecting the other of the first or second provider edge routers as a backup router for reaching the destination, the processor circuit further configured for inserting, into a data packet destined for the destination, the corresponding primary MPLS label of the primary router and the corresponding segment identifier, and the corresponding repair information of the backup router and the corresponding segment identifier, for MPLS-based multi-hop segment routing of the data packet, output into the core network by the apparatus positioned at a third edge of the core network, that enables a core router in the core network to fast reroute the data packet from the primary router to the backup router if the primary router is unavailable.

* * * * *